(12) United States Patent
Bracke

(10) Patent No.: US 7,411,611 B2
(45) Date of Patent: Aug. 12, 2008

(54) DEVICE AND METHOD FOR PERFORMING MULTIPLE VIEW IMAGING BY MEANS OF A PLURALITY OF VIDEO PROCESSING DEVICES

(75) Inventor: Ive Bracke, Wachtebeke (BE)

(73) Assignee: Barco N. V., Kortrijk (BE)

( * ) Notice: Subject to any disclaimer, the term of this patent is extended or adjusted under 35 U.S.C. 154(b) by 722 days.

(21) Appl. No.: 10/647,845

(22) Filed: Aug. 25, 2003

(65) Prior Publication Data
US 2005/0046700 A1 Mar. 3, 2005

(51) Int. Cl.
H04N 13/00 (2006.01)
(52) U.S. Cl. ..................... 348/218.1; 348/42
(58) Field of Classification Search ............ 348/218.1, 348/42–43, 47, 52, 239, 333.1, 744, 226.1; 382/154; 345/419
See application file for complete search history.

(56) References Cited

U.S. PATENT DOCUMENTS

| | | | | |
|---|---|---|---|---|
| 3,580,978 A | * | 5/1971 | Ebeling ..................... | 434/43 |
| 5,805,207 A | * | 9/1998 | Watkinson et al. ............ | 348/97 |
| 5,844,619 A | * | 12/1998 | Songer ..................... | 348/447 |
| 5,870,137 A | * | 2/1999 | Stuettler ..................... | 348/51 |
| 6,141,036 A | * | 10/2000 | Katayama et al. ............ | 348/47 |
| 6,222,589 B1 | * | 4/2001 | Faroudja et al. ............. | 348/448 |
| 6,456,432 B1 | * | 9/2002 | Lazzaro et al. ............. | 359/464 |
| 6,542,198 B1 | * | 4/2003 | Hung et al. ................. | 348/459 |
| 6,545,650 B1 | * | 4/2003 | Yamada et al. ................. | 345/7 |
| 6,549,650 B1 | * | 4/2003 | Ishikawa et al. ............ | 382/154 |
| 6,614,927 B1 | * | 9/2003 | Tabata ..................... | 382/154 |
| 6,750,904 B1 | * | 6/2004 | Lambert ................... | 348/218.1 |
| 6,975,345 B1 | * | 12/2005 | Lipton et al. ................... | 348/57 |
| 7,030,902 B2 | * | 4/2006 | Jacobs ....................... | 348/42 |
| 7,180,554 B2 | * | 2/2007 | Divelbiss et al. ............ | 348/742 |
| 2004/0233276 A1 | * | 11/2004 | Palovuori ..................... | 348/56 |
| 2006/0203085 A1 | * | 9/2006 | Tomita ..................... | 348/51 |

* cited by examiner

Primary Examiner—David Ometz
Assistant Examiner—Pritham Prabhakher
(74) Attorney, Agent, or Firm—Barnes & Thornburg LLP

(57) ABSTRACT

In one aspect, the present invention provides an imaging system for multiple view imaging. Multiple view imaging comprises, but is not limited to, stereoscopic imaging. The imaging system for multiple view imaging comprises at least two video processing devices, each of the video processing devices being for displaying a video image on one or more display devices. Each video processing device receives at least a first sequence of image frames comprising at least second sequence of image frames and a third sequence of image frames, the at least second and third sequences being for generating at least first and second video images, respectively. Each video processing device outputs at least a fourth sequence of image frames, the fourth sequences being for generating at least one of the first or second video images, the fourth sequences of image frames from the first and second video processing devices being asynchronous with respect to each other. The imaging system is adapted to generate a linking signal for synchronising images displayed by the at least first and second video processing devices on the one or more display devices. In other aspects, the present invention provides a method for performing multiple view imaging by means of at least two video processing devices, and a controller for controlling the operation of at least two video processing devices in an imaging system for displaying multiple view images.

34 Claims, 5 Drawing Sheets

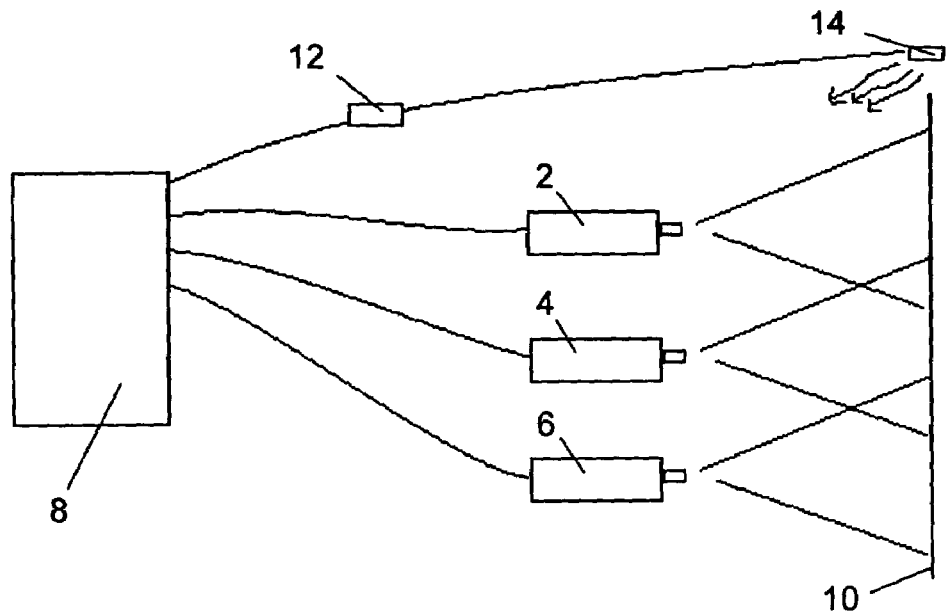
Fig. 1 - Prior art
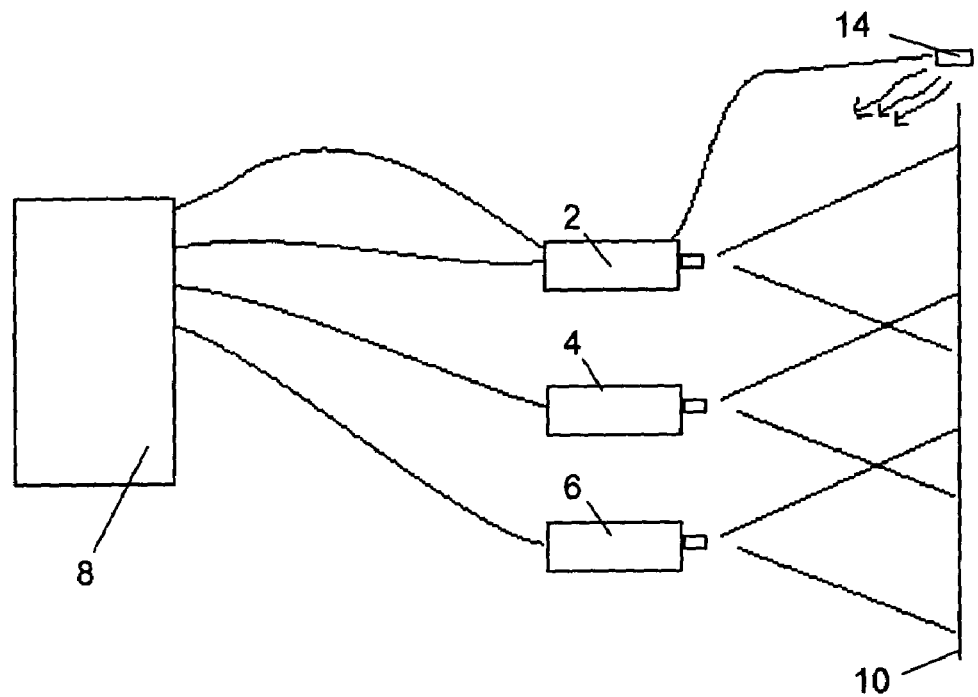
Fig. 2 - Prior art

DEVICE AND METHOD FOR PERFORMING MULTIPLE VIEW IMAGING BY MEANS OF A PLURALITY OF VIDEO PROCESSING DEVICES

TECHNICAL FIELD OF THE INVENTION

The present invention relates to methods and apparatus for multiple view image display, such as e.g. stereoscopic image display, for example stereoscopic projection or image display for being viewed by different persons from different locations, more particularly to multiple view image display by means of a plurality of video processing devices or channels as well as control methods and controllers therefor.

BACKGROUND OF THE INVENTION

Humans and many animals have binocular vision provided by two eyes which look in the same direction. Two parallel aligned but spaced eyes deliver two slightly different images of the same scene. This is due to the 4 to 6 cm separation between the eyes, which makes each eye have a slightly different viewpoint. The images from these two different viewpoints are sent to the brain, and this difference, which is termed parallax, is interpreted as depth. The nearer an object is to the eyes, the greater the difference between the two images. From the difference between the two images, the brain can display an impression of depth.

Stereoscopic image displays, such as stereoscopic projection for example, are based on the same principle: two slightly different images, one for the left eye and one for the right eye, are displayed by some means, e.g. projected onto a screen. A corresponding image modulating system enables the left eye to see only the left eye image, and the right eye to see only the right eye image.

There are at least three types of electronic stereo-3D-devices:

a) devices which produce two different images which are so arranged that the left and right eye can only see the relevant image, such as Helmet Mounted Devices (HMD) or virtual reality (VR) headsets, b) devices which project a single virtual image at a distance which is viewed by both eyes in a normal way, such as Head-Up Displays (HUD), and c) viewing glasses which influence the way each eye sees the relevant image on the display. These glasses may have liquid crystal-shutter glasses or polarisers or include colour filters such as red and green filters.

HMDs are basically wearable monitors. To allow stereoscopic vision, an image is projected onto a beam splitter in front of each eye. For VR headsets a miniature liquid crystal display (LCD) can be placed in front of each eye.

In active stereo, shutter glasses or shutter screens are used in conjunction with a normal CRT, digital light processing (DLP), or equivalent monitor or projector. The two images required for stereoscopic vision are displayed in turn. For a fraction of a second the image dedicated to the left eye is displayed, after that the image for the right eye appears for the same duration of time, and so on. The job of the glasses is to prevent the left eye from seeing the image dedicated to the right eye and vice versa. To do this, light is blocked by a shutter. The frequency of the shutter is adapted to the frequency of the displayed images. The blocking can be done by having a filter which alternates between opaque and transparent.

Passive stereo displays are based on the principle of different light polarisations or of differences in frequency (colour). For example, the viewer wears a pair of glasses containing two oppositely polarised lenses or filters, one for the left eye and one for the right eye. The light from each of two projected images is polarised differently and can pass only through its corresponding filter. If the images are provided by means of a single projector, the projector alternates the left eye information with the right eye information at double refresh rate. A screen in front of the projector's lenses alternates the polarisation of the projected image in such a way that the image of each eye passes only through its corresponding polarising filter of the pair of passive stereo glasses. If the images are provided by means of two projectors, one projector displays the left eye information and the other display the right eye information, both at a standard refresh rate. A polarising filter mounted in the optical path of each projector ensures that the correct information passes through its corresponding filter in the pair of passive stereo glasses. If the projectors are LCD projectors, they may be internally polarised, thus eliminating the requirement for external filters. The two-projector approach has the added value over the one-projector approach of providing higher brightness.

Stereoscopic image display may be used, a.o. in keyhole surgery, in entertainment applications, such as gaming environments, in training environments such as in flight simulators, ship bridge simulators, air traffic control, mission rehearsal simulators, and in visualisation of large data-sets, such as in car design for example.

Currently, projectors can display useful active stereo 3D-images from an image source such as an image generator (IG) if the vertical frequency is typically greater than 96 Hz. Typical large venue systems may use three projectors to produce a large image by tiling. Such a prior art set-up for active stereo 3D projection is shown in FIG. 1. It comprises three projectors 2, 4, 6 which each are connected to an image source 8, from which the projectors 2, 4, 6 receive images to be displayed on a display screen 10. An inverter 12 may be provided which is coupled both to the image source 8 and to an IR-emitter (infrared emitter) 14 for sending signals to shutter glasses (not represented), so as to be in phase with the displayed images, i.e. so that the left eye only receives images intended for the left eye, and so that the right eye only receives images intended for the right eye. The presence of an inverter 12 is technology dependent: when using projectors designed such that there is a delay of one image frame between reception and projection of images, and therefore an inverter 12 is necessary to make the shutter glasses to be in phase with the displayed images, but for other types of projectors such inverter may not be necessary.

According to an alternative prior art embodiment, as represented in FIG. 2, which e.g. uses Barco Galaxy projectors, obtainable from Barco Projection Systems, Kuurne, Belgium, the inverter for the IR signals may be integrated into one of the projectors, so as to add an adjustable delay to the shuttering to overcome the processing delay of the image in the projectors.

If a vertical frequency of 96 Hz is used for displaying the stereoscopic image, then the left and right images are updated at only 48 Hz. This results in flickering of the 3D-image, which is annoying and fatiguing, and is preferably to be avoided.

Furthermore IGs generating images for both eyes each at 48 Hz or more have to be powerful, and thus are expensive. It would be much cheaper if images could be generated at a lower frequency. However, displaying these images at these lower frequencies would certainly result in flickering images, and is thus not desirable.

On the other hand, if the 3D-image is displayed at a different vertical frequency greater than the input frequency in order to reduce flicker, the projectors will have asynchronously up converted the frequency. In this case, there is no longer a frequency nor phase relation between a displayed image and the IG-image. Therefore, in a multiple projector system, the stereo performance will be poor as each projector creates its own refresh rate that is not synchronised with the others and, for active stereo systems, with the control signal of the shutter glasses. Implementing the emitter phasing logic as in the set-up of FIG. 2 cannot overcome the differences between these images and the emitter control signal. Even if the control signal for the shutter glasses was generated by a projector then the glasses would only be synchronised with one projector channel.

SUMMARY OF THE INVENTION

It is therefore an object of the present invention to provide a multiple view imaging system comprising a plurality of video processing devices and a method of operating and/or controlling the same such that the display is less fatiguing and preferably provides more pleasing multiple view images. With "multiple view" in the context of the present invention is meant both the case where different images are viewed by different observers on the same screen, and the case where stereoscopic images are viewed by the left and right eyes of a person (stereoscopic imaging).

The above objective is accomplished by a device and method according to the present invention.

In one aspect, the present invention provides an imaging system for multiple view imaging. Multiple view imaging comprises, but is not limited to, stereoscopic imaging. The imaging system for multiple view imaging comprises at least a first and a second video processing device, each of the at least first and second video processing devices being for displaying a video image on one or more display devices. A display device may for example be a screen or a monitor such as a visual display unit (VDU) or the LCD screen of a laptop or an array of LED's, e.g. an array of LED times, each tile comprising an array of LED pixel devices or may be the screen of a PDA. There may be one or more display devices, i.e. the video processing devices can e.g. display images on different screens, or on one large screen forming a tiled image. Each of the video processing devices is receiving, electronically, optically or by any other method, at least a first sequence of image frames comprising at least a second sequence of image frames and a third sequence of image frames, the at least second and third sequences of image frames being for generating at least first and second video images respectively. Inputs of the video processing devices can be linked together, e.g. with interfaces to a Local Area network or a Wide Area Network (WAN) or the inputs may be in wireless connection with image sources, e.g. each video processing unit may have an interface for a wireless LAN such as communicates at radio frequencies or at optical frequencies such as infra-red, for example a diffuse infra-red LAN. The first sequence of image frames is a stream of image sets consisting of images of at least two types. It is at least a dual image video signal, comprising second and third sequences which are applied either serially, as concatenated image frames, or in parallel to each of the video processing devices. Each video processing device is outputting at least a fourth sequence of image frames, the fourth sequences of image frames being for generating at least one of the first or second video images. The signal output by a video processing device is thus a signal which can be, in one way or another, displayed. It could be for example data packets of analog or digital signals on a cable or a wireless system, such as e.g. a LAN such as an Ethernet LAN, token ring, Hyperlan, Wavelan, diffuse infrared LAN, line of sight infrared LAN, or may be directly connected by any suitable means such as via a DECT, USB, FireWire, optical cable connection, etc. The fourth sequences of image frames from at least one of the first and second video processing devices are provided synchronous with respect to each other in accordance with the present invention despite the fact that they are asynchronous with their input sequences. With 'asynchronous' is meant that the fourth sequences may have another frame rate, or that they may have an undefined relative phase with respect to the input sequences. The imaging system according to the present invention is adapted to generate a linking signal for synchronising images to be displayed on the at least one display device. Preferably, output sequences of the video processing devices are synchronised by means of the linking signal. The linking signal can be placed anywhere in the system provided that it controls the rate and phase of displayed images among on at least one display devices. The at least first and second multiple view input image frames may comprise e.g. left and right input image frames, or for example far left, left, right and far right input image frames. The at least first and second video images may be alternating framewise when displayed to form a multiple view image.

The fourth sequence may comprise at least a fifth sequence of multiple view display image frames and a sixth sequence of multiple view display image frames, the at least fifth and sixth sequences of image frames being for generating the at least first and second video images, respectively.

The linking signal may be an additional signal to those signals required to display the first or second images per se. The linking signal may be data packets transmitted over a cable or a wireless system, for example Ethernet, token ring, Hyperlan, Wavelan, diffuse infrared, line of sight infrared, DECT, USB, FireWire, BlueTooth, optical cable. It may be serial or parallel signals. It may also be a custom signal on a direct connection such as cable or wireless connection, e.g. a point-to-point infra-red signal.

In an imaging system according to the present invention, each video processing device may receive furthermore an input control signal corresponding to an input rate and phase of the second and third sequences of input image frames. For example for a stereoscopic video processing device, the input control signal is an input stereo control signal corresponding to an input rate and a stereoscopic phase of the sequence of input image frames.

The linking signal may be generated externally to the video processing devices. Alternatively, the linking signal may be generated internally in one of the video processing devices. The linking signal may be derived from any signal which is required for displaying the video such as vertical or horizontal synchs.

An imaging system according to the present invention may furthermore comprise at least one image source. There may be at least two image sources of different types.

An imaging system according to the present invention may be adapted to process the first sequence of input image frames and may have means for field rate converting the first sequence. Processing of the sequence of input image frames may for example include up-conversion, down-conversion, encoding, decoding, compression, gamma correction, rate adaptation, phase synch adaptation, format or protocol conversion, etc. The input image frames may be processed in frame pairs or in a non-paired operation. The processing is completed in such a way as to preserve the integrity of the first sequence, i.e. a proper compliment of image types is preserved. The frame pairs may be left/right or right/left frame pairs, what corresponds to a normal video stream. Alternatively, the frame pairs may be odd/even or even/odd pairs what corresponds to interlaced video streams.

The imaging system may be adapted to generate an output control signal for an image modulation device allowing the image modulation device to properly synchronise with the output rate and phase of the fifth and sixth sequences. For example for a stereoscopic video processing device the output control signal is an output stereo control signal. The image modulation device may be any of active glasses with a synchronisation system, e.g. shutter glasses, passive glasses such as a LCD panel with a "Z-Screen", a product by StereoGraphics, California, or another actively controlled obscuration device.

The output control signal, e.g. stereo control signal, may be functionally compatible with the linking signal, thus eliminating the need for both separate signals.

The input control signal may be provided by any of a separate signal, a signal encoded on a vertical synchronisation signal, a signal encoded as an even/odd field, or a signal encoded in the video signal.

In an imaging system according to the present invention, the first sequence comprising second and third sequences may be any of:
a single video input signal with video frames containing left/right fields,
a single video input signal with video frames using even field/odd field,
a single video input signal where left/right imagery is spatially separated in a single video image,
a dual video input signal comprising a first single video input signal and a second single video input signal, where the first single video input signal is designated as left and the second single video input signal is designated as the right.

In an imaging system according to the present invention, the output of the video processing devices may be any of:
a single video output signal with video frames containing left/right fields,
a single video output signal with video frames using even field/odd field,
a single video output signal where left/right imagery is spatially separated in a single video image,
a dual video output signal comprising a first single video output signal and a second single video output signal, wherein the first single video output signal is designated as left and the second single video output signal is designated as the right.

An imaging system according to the present invention may be adapted to reduce latency between a pair of image frames of the first sequence of image frames and a subsequent output of a corresponding pair of image frames of the fourth sequence by starting the output of a first multiple view display image frame of the pair of display image frames of the fourth sequence before arrival of the complete pair of image frames of the first sequence of image frames when it is known that the completion of the arrival will occur before the expected completion of the output of the first multiple view display image frame of the fourth sequence.

An imaging system according to the present invention may further comprise splitting means for splitting the first sequence of image frames into the second sequence and third sequence, e.g. the second sequence as intended to be viewed by a first eye and the third sequence intended to be viewed by a second eye of a human person. The imaging system may furthermore comprise processing means for processing any of the second sequence or third sequence. The imaging system may furthermore comprise a combining means for combining the second sequence and the third sequence into one combined stream of image frames, possibly after splitting and possibly processing.

The at least two video processing devices may be any of, or a combination of, projectors or displays such as front projectors, rear projectors, direct view displays, or may be included in self-contained control devices with video outputs to drive display devices using video signals, such as video boxes or control devices suitable for being hooked up to a monitor.

In a second aspect, the present invention provides the use of an imaging system according to the present invention, where the video processing devices create any of, or a combination of two or more of:
a single large image by tiling the at least two video processing devices, multiple separate independent tiled images by using multiple sub-sets of the at least two video processing devices, or
single projected images using a single video processing device.

In a third aspect, the present invention provides a method for performing multiple view imaging by means of at least a first and a second video processing devices, each of the at least first and second video processing devices being for displaying a video image on one or more display devices. The method comprises receiving, electronically, optically or in any other suitable method, at least a first sequence of image frames comprising at least a second sequence of image frames and a third sequence of image frames, the at least second and third sequences of image frames being for generating at least first and second video images, respectively, and outputting at least a fourth sequence of image frames, the at least fourth sequences of image frames being for generating at least one of the first and second video images, the fourth sequences of image frames from the first and second video processing devices being made synchronous with respect to each other in accordance with the present invention despite these sequences being asynchronous with respect to their respective input sequences. The method comprises generating a linking signal for synchronising so that images displayed from signals derived from the at least first and second video processing devices are synchronised on the one or more display devices. This may be achieved by synchronising the output of the video processing devices. The at least second and third sequences of image frames may comprise e.g. left and right input image frames, or for example far left, left, right and far right input image frames.

Generating the linking signal may comprise generating the linking signal externally to the video processing devices or generating it internally in one of the video processing devices.

The method may furthermore comprise providing images from at least one image source. The images may be provided from at least two image sources of different type.

A method according to the present invention may comprise processing the first sequence of image frames in pairs for the purpose of field rate conversion. Processing the first sequence of image frames in pairs may for example comprise copying a pair of image frames of the first sequence and inserting the copied pair in the first sequence for the purpose of up conversion, or eliminating a pair of image frames from the first sequence for the purpose of down conversion. The frame pairs may be left/right or right/left pairs, corresponding to a normal video stream, or odd/even or even/odd pairs, corresponding to interlaced video streams.

The method may furthermore comprise generating a control signal for an image modulation device, such as shutter glasses or an LCD panel such as a Z-screen, allowing the image modulation device to properly synchronise with a output rate and phase of the fourth sequence of image frames.

The processing of image frames of the first sequence may be optimised to reduce latency between a pair of image frames of the first sequence and a subsequent output of a corresponding pair of image frames of the fourth sequence by starting the output of a first multiple view display image frame of the fourth sequence before arrival of the complete pair of image frames of the first sequence when it is known that the completion of the arrival will occur before the expected completion of the output of the first multiple view display image frame of the fourth sequence.

A method according to the present invention may comprise splitting the first sequence of image frames into the second sequence and third sequences, e.g. the second sequence intended to be viewed by a first eye and the third sequence intended to be viewed by a second eye of a human person. This relates to stereoscopic imaging. The method may furthermore comprise processing any of the second sequence or third sequence. The method may furthermore comprise combining the second sequence and the third sequence into one combined stream.

In a further aspect, the present invention also provides a controller for controlling the operation of at least a first and second video processing devices in an imaging system for displaying multiple view images, each of the at least first and second video processing devices being for displaying a video image on one or more display devices, each video processing device receiving at least a first image frame sequence comprising at least a second sequence of image frames and a third sequence of image frames, the at least second and third sequences of image frames being for generating at least first and second video images, respectively, and each video processing device outputting at least a fourth sequence of image frames, the fourth sequences of image frames being for generating at least one of the first or second video images, the fourth sequences of image frames from the first and second video processing devices being made synchronous with respect to each other in accordance with the present invention, wherein the controller is adapted to generate a linking signal for synchronising so that images derived from the at least first and second video processing devices are synchronised when these images are displayed on the one or more display devices.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 1 is a schematic view of a first prior art set-up of an image generator and three projectors for stereoscopic image display, comprising a separate IR emitter for controlling the shuttering of shutter glasses to be used with the stereoscopic imaging system.

FIG. 2 is a schematic view of a second prior art set-up of an image generator and three projectors for stereoscopic image display, comprising an IR emitter for controlling the shuttering of shutter glasses to be used with the stereoscopic imaging system, in which emitter phasing logic is integrated into one of the projectors.

FIG. 4a) shows a sequence of input images intended for the left and right eye respectively, which input images come from an IG and are applied e.g. to a projection system. FIG. 4b) shows a control signal corresponding to the input video signal for controlling the shutter of the glasses for viewing stereoscopic images. FIG. 4c) illustrates, for comparison reasons, conventional up-conversion of the input video, in which individual left eye or right eye images are repeated. FIG. 4d) illustrates up-conversion according to the first embodiment of the present invention, in which full image pairs are repeated, and in which display of an image pair is only started after having received the complete pair. FIG. 4e) shows a control signal corresponding to the up-converted output video signal of FIG. 4d) for controlling the shutter of the glasses for viewing stereoscopic images.

FIG. 5a) shows a sequence of input images intended for the left and right eye respectively, which input images come from an IG and are applied e.g. to a projection system. FIG. 5b) shows a control signal corresponding to the input video signal for controlling the shutter of the glasses for viewing stereoscopic images. FIG. 5c) illustrates, for comparison reasons, up-conversion of the input video according to the previous embodiment of the present invention, in which display of an image pair is only started after having received the complete pair. FIG. 5d) illustrates up-conversion according to the present embodiment of the present invention, in which full image pairs are repeated, and in which display of an image pair is started before having received the complete pair. FIG. 5e) shows a control signal corresponding to the up-converted output video signal of FIG. 5d) for controlling the shutter of the glasses for viewing stereoscopic images.

Figure 3:
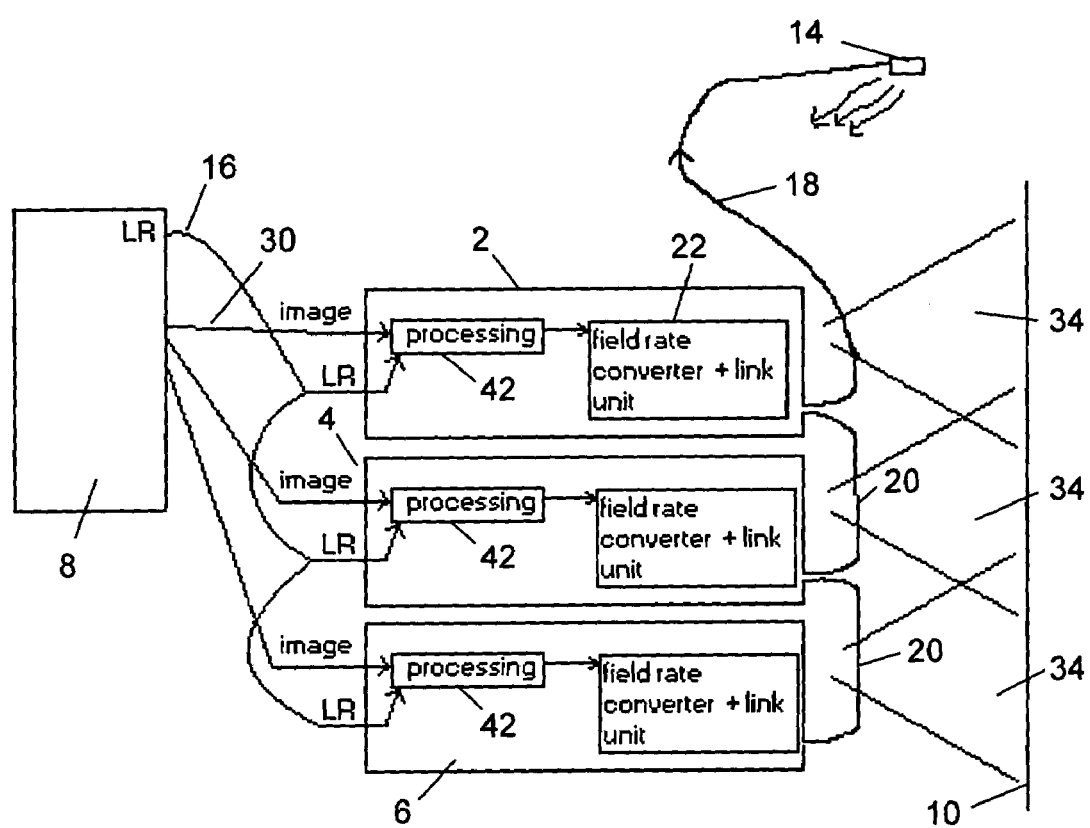
FIG. 3 is a schematic view of a stereoscopic image display system set-up according to an embodiment of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. In particular the detailed description of the present invention refers to stereoscopic imaging, but it is not intended to limit the invention thereto. The invention also covers "multiple view display" in the sense of images being divided between observers looking from different locations in a room at the same screen or different screens onto which images are being displayed.

The drawings described are only schematic and are non-limiting. In the drawings, the size of some of the elements may be exaggerated and not drawn on scale for illustrative purposes.

The term "video" as used in this invention should be interpreted broadly. It includes not only sequences of video frames which are in accordance with a known television, multimedia or other display format but also any sequence of framed data which can be used to display images. Thus a video signal in accordance with the present invention may include various control signals such as vertical or horizontal synchs but this is not a requirement of the present invention. For instance, the term video includes a series of arrays of data, each array representing an image.

A set-up of a stereoscopic imaging system according to the present invention is illustrated in FIG. 3. An image source 8, such as e.g. an image generator (IG), generates images intended for the left eye and images intended for the right eye. This may be done for each of the imaging devices or video processing devices, such as projectors 2, 4, 6, in the stereoscopic imaging system. The video processing devices may be any suitable active stereo 3D display or device, for example, full projectors, stand-alone projection boxes, active to passive conversion devices, monitors, VR headsets or HMDs. In the following description, projectors are considered, but this is not intended to be limiting to the invention. The image source 8 may be any kind of image source, such as one or a plurality of cameras, or an IG, which is a computer or computing device adapted for generating images. There does not need to be an input video signal applied to the projectors; the video signal may be generated inside the projectors, such as dynamically varying 3D fractals or other pleasing abstract shapes which may be generated by a mathematical formula or by other means in a computation unit such as a personal computer for example. This means that an IG may be incorporated e.g. in each of the projectors 2, 4, 6. Alternatively, instead of one single image source 8, a plurality of image sources may be provided. The plurality of image sources may be of different types, for example a first image source comprising a plurality of cameras providing images for a first projector, and a second image source comprising an image generator for providing images for a second projector, whereby the images from the first projector may be superimposed on the images from the second projector, e.g. for introducing computer animation in a real scene. If a plurality of image sources are used, they may have non-synchronised outputs.

In a typical prior art set-up of a plurality of projectors, e.g. three projectors, as in FIG. 1 and FIG. 2, the projectors will start displaying a new field when they get a trigger (e.g. a vertical sync pulse) from the IG 8. With currently available devices the IG's vertical frequency can be between 96 Hz and 108 Hz although this is not anticipated as a limitation of the present invention.

If the 3D-image is to be shown at a different vertical frequency, for example an up-converted vertical frequency in order to prevent flicker, the plurality of projectors in the imaging system will asynchronously up-convert the frequency of the stream of image frames in a way that is compatible with active stereo operation.

Figure 4:
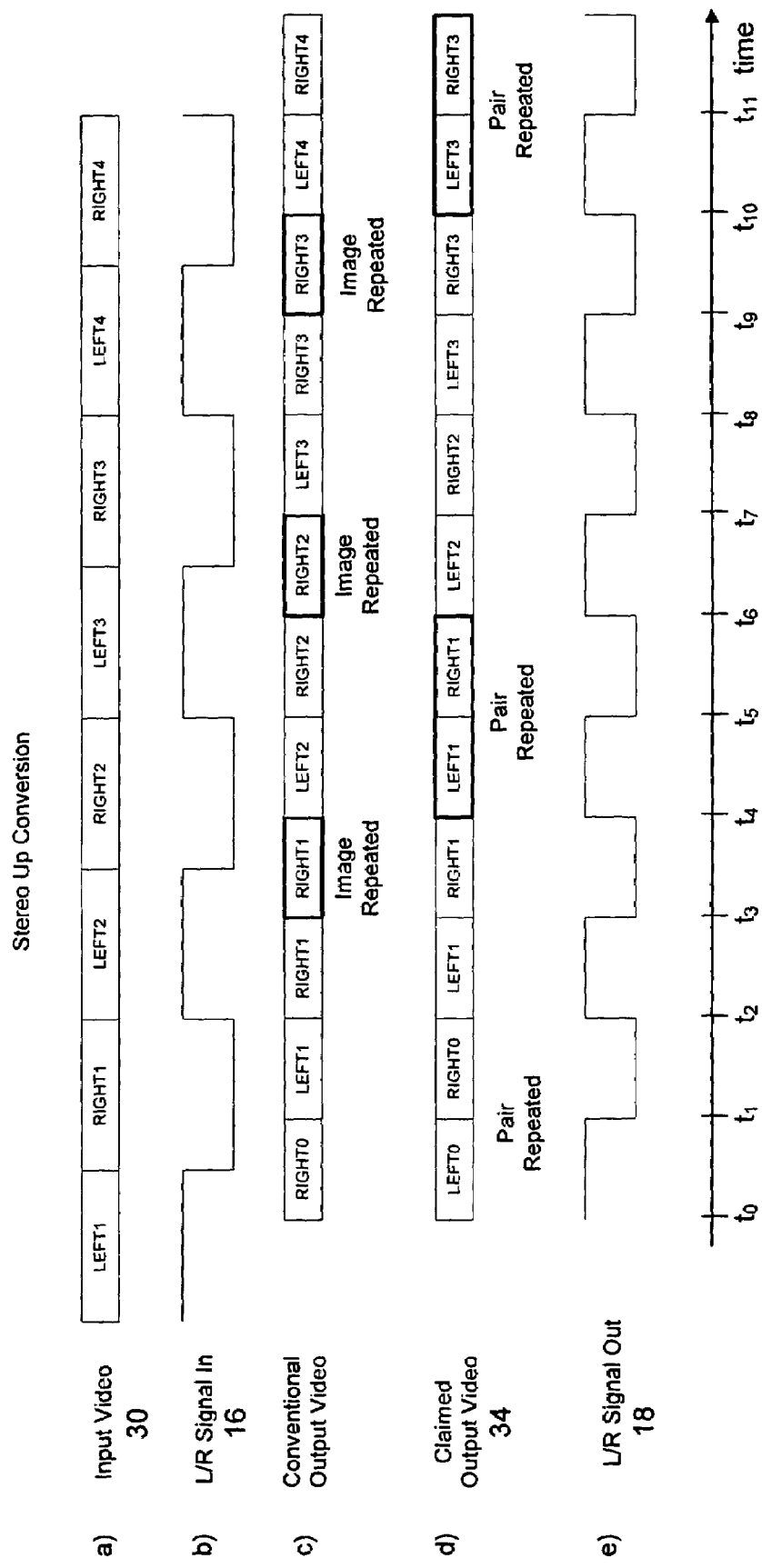
FIG. 4 is a time-frame diagram for explaining up-conversion according to an embodiment of the present invention.

An example of input video 30, a sequence of left/right images, e.g. image frames, as generated by an image source 8 and applied to the projectors 2, 4, 6 is shown in FIG. 4a) and in FIG. 5a). The projectors 2, 4, 6 project images on a display screen 10, by projecting output image signals 34 onto the display screen 10. Examples of a sequence of left/right images as output by a projector 2, 4, 6 are shown in FIG. 4d) and in FIG. 5d).

According to an embodiment of the present invention, the image source 8 provides images intended for the left eye, that is a sequence of image frames, and images intended for the right eye, that is a sequence of image frames, and this for each of the projectors 2, 4, 6, at a first frame frequency, e.g. a low frequency such as 24 Hz or 30 Hz for example. When providing frames at such low frequencies, a less powerful and thus cheaper image source can be used, e.g. a less powerful IG can generate a 3-channel 3D-image. These low frequency image frames are then up-converted, in the projectors 2, 4, 6 or in a separate unit, so as to be displayed e.g. at 110 Hz for example. However, any frequency compatible with the display and shutter system is possible. When up-converting, the projected frames are displayed at a greater frame rate than the input. Stereoscopic image display in which the display of the images is at a frame rate which is different from the frame rate of the input of images is also called asynchronous stereoscopic image display. When needed, a frame consisting of both a left and right eye image is repeated in order to maintain the continuous display of images until a new input frame is received. Alternative methods may be used for up-converting, e.g. generating intermediate frames by interpolating between frames which maintains meaningful separation between the left and right video sequences.

The up-converting technique is significant, as many commonly used IGs cannot generate three channel images at 1280×1024 resolution with proper overlaps while maintaining vertical rates typically higher than 96 Hz. Generating these images at a lower frame rate and up-converting the frame rate for display is a convenient solution.

If the low frequency image frames as mentioned above are multiplexed into a sequence of alternately a left eye image frame and a right eye image frame, an image sequence at respectively 48 Hz or 60 Hz is generated. Displaying such a sequence at 48 Hz or 60 Hz leads to a flickering image which is not suitable for being looked at for a longer period of time, and which may induce unpleasant mental states even triggering an epileptic fit. FIG. 4a) illustrates e.g. such 60 Hz input video signal, which comprises left eye image frames at 30 Hz and right eye image frames at 30 Hz.

FIG. 4c) illustrates how conventional up-conversion of the video signal would be done, if it were desired to display the signal at a higher frequency. Up-conversion is traditionally performed by repeating the last displayed image frame. In the example given, after having displayed left eye image frame left 1 and right eye image frame right 1, the right eye image frame right 1 is repeated. After this repetition, the normal sequence follows, that is left eye image frame left 2 and right eye image frame right 2; and thereafter right eye image frame right 2 is repeated. The corresponding up-converted outgoing signal 18 for controlling the image modulation device, e.g. to control the shuttering of the glasses, for example by controlling the IR emitter 14 is illustrated in FIG. 4e). However, by repeating right eye image frame right 1, as in the example given above, at a moment $t_3$, the image which is applied to the left eye, is an image which was in fact intended for the right eye. Also the images applied to any of the eyes at moments $t_4$ and $t_5$ are images which were intended to be applied to the other eye. It is only at the moment of repeating another image frame, in the example given in FIG. 4c) right 2, that the correct sequence is applied to the correct eye again. This is not allowable for stereoscopic imaging. Therefore the standard method of frame insertion does not work for stereo images.

According to an embodiment of the present invention, up-conversion is carried out by processing the image frames in frame pairs, for example left/right pairs. This means that, for up-conversion a complete frame pair is repeated, as illustrated in FIG. 4d). To up-convert a stereo source properly, the left/right frames are repeated as a pair, maintaining the left/right sequence. As can be seen in the drawing, after having displayed the frame pair left 1, right 1, at moment $t_4$ display of frame pair left 2, right 2 should be performed. However, as can be seen from FIG. 4a), at that moment in time, the frame pair left 2, right 2 is not completely received yet. Therefore, according to this embodiment of the present invention, the frame pair left 1, right 1 is repeated. After having repeated the frame pair left 1, right 1, i.e. at moment $t_6$, the frame pair left 2, right 2 is completely received and ready for display. Therefore, at moment $t_6$, display of frame pair left 2, right 2 starts. Up-conversion can e.g. be done to a frame rate of 110 Hz, which means that images for the left eye are displayed at 55 Hz and that images for the right eye are displayed at 55 Hz. In this way, flicker-free images are obtained.

Figure 5:
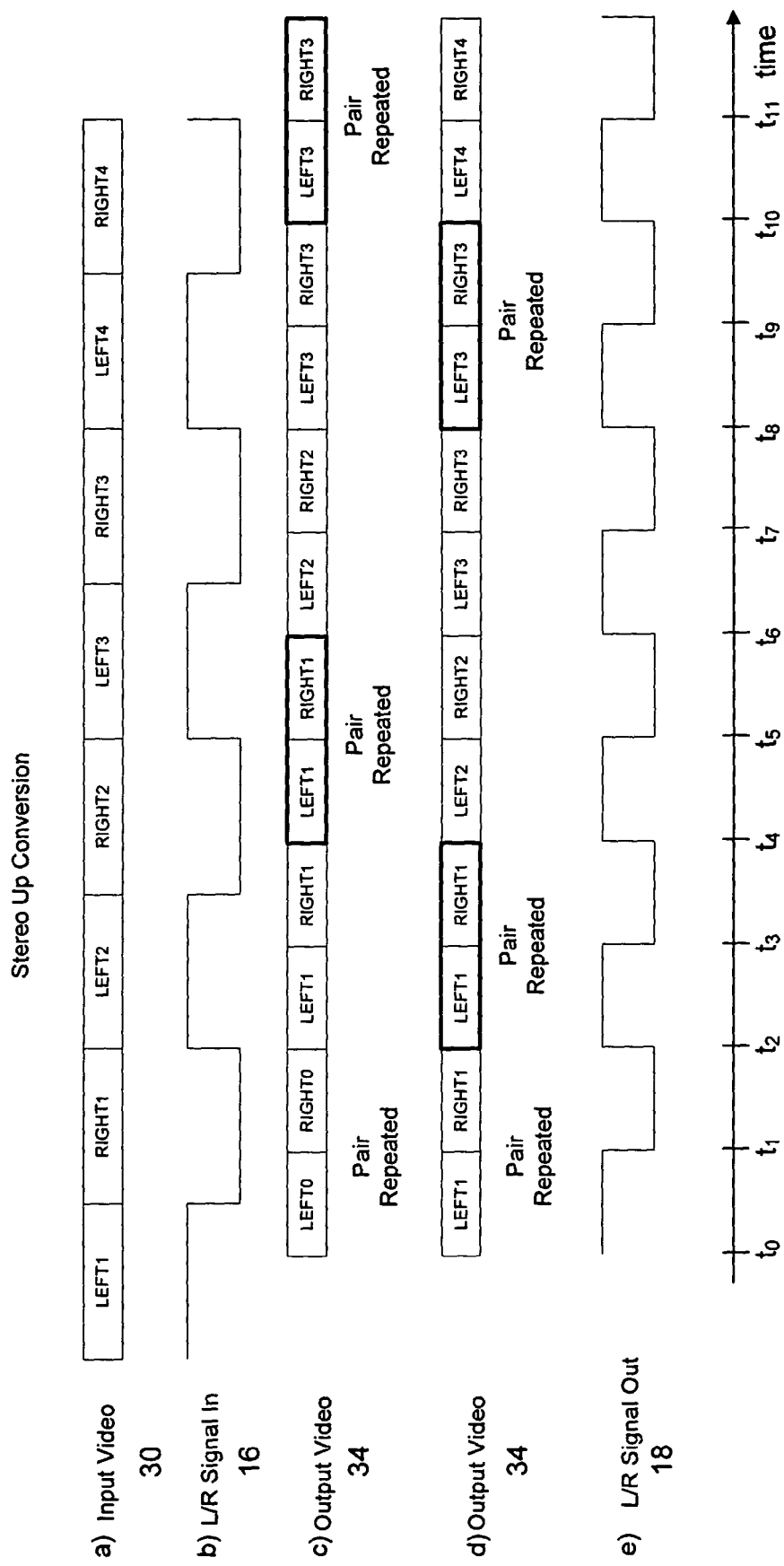
FIG. 5 is a time-frame diagram for explaining up-conversion according to another embodiment of the present invention.

According to another embodiment of the present invention, as represented in FIG. 5, up-conversion may also be carried out by repeating a complete frame pair. However, contrary to the embodiment of FIG. 4d), which, for comparison reasons is also represented in FIG. 5c), in the present embodiment, the repeating of the pair of image frames is optimised to reduce latency between an input and a subsequent output of the pair of image frames. This may be done by starting the output of a first frame of the pair of video frames before arrival of the complete pair when it is known that the completion of the arrival will occur before the expected completion of the output of the first image. This is illustrated in FIG. 5d). As can be seen, at the moment $t_4$, the complete pair left 2, right 2 has not been received yet. However, left 2 has already completely been received, and part of right 2 has already been received. Display of left 2 is started, and at the moment $t_5$, display of right 2 is started, right 2 having been completely received in the mean time. At the moment $t_8$ the pair left 3, right 3 is repeated is in the previous embodiment.

According to still another embodiment of the present invention, up-conversion may be carried out in a non-paired operation, for example in a separate processing for left and right images. An incoming input video signal comprising a sequence of left and right images is separated in a separation device into a first stream of left images and a second stream of right images. Each of those streams is processed separately, and up-conversion can take place on each of those streams separately. After this up-conversion step, both streams are recombined into one single output stream in a combiner unit. The output stream comprises a sequence of left and right images at a higher rate.

In the above cases of field rate conversion (up-conversion), there is no frequency nor phase relation between the displayed image and the image generated by the image source 8.

The image source 8 also generates a Left/Right in signal 16, ultimately to be used for controlling the operation of image modulation devices such as for controlling shuttering of glasses used for viewing the stereoscopic images, e.g. a control signal to be applied to IR emitter 14. FIG. 4b) illustrates the incoming Left/Right signal 16 for controlling the image modulation device, corresponding to the stream 30 of image frames as generated by the image source 8. The Left/Right signal 16 is a 30 Hz signal as well. This control signal 16 is fed to each of the projectors 2, 4, 6 to which images from that image source 8 are applied. When working asynchronously, in accordance with an aspect of the present invention, a Left/Right out signal 18 has to be generated that matches the left/right frames at the output frequency.

When a plurality of asynchronously field rate converting projectors are used with the control signal 18 for controlling the image modulation device, e.g. shuttering of the glasses, a control signal 18 is generated by one of the projectors, a stereo image will be seen. However, in a multiple projector system, the stereo performance would be poor as each projector 2, 4, 6 creates its own refresh rate that is not synchronised with the others. In this case, the image modulation device (glasses) would only be synchronised with one projector channel. To get a good 3D-image, all projectors 2, 4, 6 must display the left and right image at the same time, so they must be synchronised. Therefore, a link 20 is routed to all the projectors 2, 4, 6 in the system. This link 20 provides a reference signal such that the projectors 2, 4, 6 may synchronise their outputs in both frequency and stereoscopic phase. This is illustrated in FIG. 3 and in FIG. 6. By "stereoscopic phase" is means not only that frames displayed by each projector 2,4,6 are synchronised with each other but also that the synchronisation respects whether the frame is destined for the left eye or the right eye. That is when synchronised for stereoscopic phase all left image frames are displayed at the same time and similarly for the right frames. In this way, the human eye sees the correct image for that eye independent of which projector 2,4,6 is viewed.

Figure 6:
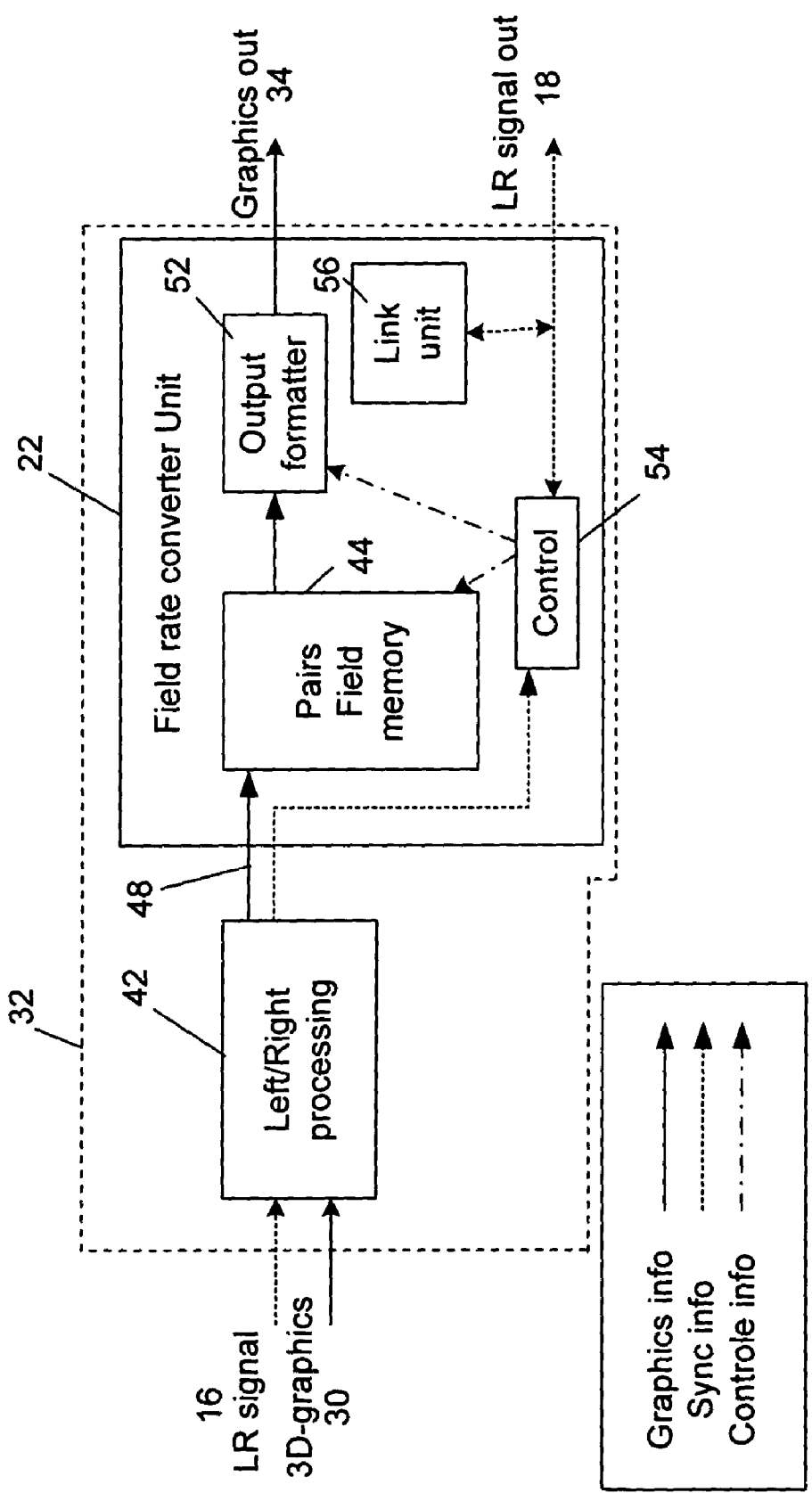
FIG. 6 illustrates a block-schematic of an implementation of an asynchronous stereoscopic video processing device according to an embodiment of the present invention.

FIG. 6 illustrates a block-schematic of an implementation of an asynchronous stereoscopic video processing device according to an embodiment of the present invention. A 3D graphics signal 30 and a corresponding control signal 16 for the image modulation device, e.g. for the shutters of the glasses, are sent to a video processing device 32, such as a projector or a monitor for example, which outputs a synchronous or asynchronous graphics signal 34 and a corresponding control signal 18 for the image modulation device, e.g. the shutters of the glasses. Inside the video processing device 32, the graphics signal 30 may optionally be processed. This may be done by processing the incoming stream 30 of image frames as a whole in a processing unit 42, which results in a processed image stream 48. Alternatively, but not represented in the drawings, the stream 30 may be split up in a splitting device or demultiplexer into a separate video stream for the left eye and a separate video stream for the right eye. Each of those streams may be separately processed in a left processing device and a right processing device, as described in EP-1093307. The separate processing of the left and right streams may be done to perform normal video processing, such as e.g. warping, colour shifting, spatial filtering, peaking, smoothing etc., and to perform it differently on the different data streams. In a combining unit, the processed left and right video streams may be combined again into one combined processed 3D graphics stream 48 by means of a combining means or multiplexer.

The image frames of the stream 30 of incoming images or of the processed image stream 48 are stored in a field memory 44 of a field rate converter unit 22. The field memory 44 may be a RAM. The storing of the image frames in the field memory 44 is controlled by a control unit 54.

The control unit 54 also controls the sequence and timing of image frames in the graphics output video stream 34, for example when up-converting the 3D-graphics input video stream 30 by controlling the repetition of image frames by pairs. The control unit 54 indicates which image frame has to be put in the output sequence 34. An output formatter 52, controlled by the controller 54, provides the right timings for outputting images.

A link unit 56 is provided in each projector 2, 4, 6. A link 20 is made between the link unit 56 of each projector 2, 4, 6 and the link unit 56 of any of the other projectors 2, 4, 6, so that all projectors 2, 4, 6 in the imaging system are coupled to each other. By the link 20, the output images of the plurality of projectors 2, 4, 6 may be synchronised in phase and frequency. The link unit 56 may be some logic, or a μ-processor for example.

As soon as one of the projectors 2, 4, 6 is ready to display a next image, a trigger is sent over the links 20 to the link units 56 of the other projectors. The projector generating the trigger is called a master and the other projectors are called the slaves. As soon as a trigger is received by the slaves, a next image is displayed. The link unit 56 thus gives a sign, or trigger, to each of the projectors, over the links 20, e.g. to display a next left or right image frame. Which image is displayed, and where it is fetched in the memory 44, is controlled by the control unit 54 of each projector.

Alternatively, instead of a master projector triggering the slave projectors, the trigger signal can be generated externally to all projectors, and be applied to the link unit 56 of each projector.

Also the control signal 16 for controlling the shuttering of the image modulation device such as glasses must be synchronised with the output images of the projectors, as this control signal must be at the same frequency and in phase with the displayed image (and not with the generated image) in order to get a good stereoscopic viewing effect. So, when operating asynchronously, as when up-conversion is performed for example, it is not possible to use the signal coming from the image source by simple inversion or phase adjustment.

The control signal for controlling the image modulation device, e.g. for controlling the shuttering of the glasses is therefore generated by one of the projectors itself and not by the image source 8. However, the control signal 16 from the image source 8 is still needed for the input because the projector must know which field is left or right at its input from the image source 8. It is not the case that this control signal must be a separate connection to the projector. The intent of the control signal may be embedded in one or many of the existing signals connected to the projector. For example the width of the vertical synchronisation pulse may be used to encode the Left/Right information to the projector. The projector creates or gets a control signal 18 for controlling the image modulation device, e.g. for controlling the shuttering of the glasses based on the timing of the asynchronous image pairs actually projected. The control signal 18 may be created by means of an oscillator. The phase between the control signal 18 for controlling the image modulation device, e.g. to control the shuttering of the glasses, and the image of the projector 2, 4, 6 can be adjusted to optimise the 3D-image as seen through image modulators, e.g. shutters (of the glasses) that may have their own built-in delay or switching characteristics.

If the frame sequence of FIG. 4*d*) is now compared with the signal 16 for controlling the image modulation device, e.g. to control the shuttering of the glasses, e.g. the signal to be sent to the IR emitter 14, it can be seen that at any moment in time, images intended for the left eye are applied to the left eye, and images intended for the right eye are applied to the right eye.

It is to be understood that although preferred embodiments, specific constructions and configurations, as well as materials, have been discussed herein for devices according to the present invention, various changes or modifications in form and detail may be made without departing from the scope and spirit of this invention.

For example, only up-conversion has been described in the detailed description. However, also down-conversion can be performed according to the present invention. In this case also, the asynchronous mode, more specifically the down-converting, is based on left/right frame pairs rather than on single frames. This means that, in order to down-convert, frames will be skipped in frame pairs or according to corresponding up-conversion methods.

Furthermore, the examples suggest the use of shutter glasses. However, the principles of the present invention can equally well be applied to any occlusion system such as a projector mounted electronically controlled polarisation screen used with passive polarisation glasses.

Furthermore, the examples suggest the use of only Left/Right image pairs. However, the principles of the present invention can equally be applied to any number of image sets used in any of a multiple of ways. For example, a set of four images Far Left, Left, Right, Far Right could be used to provide position dependent stereo images. It is also possible to dedicate such image separation techniques to not only stereoscopic viewing but also to directing unique images to different viewers. In this case, viewer one would have occlusion devices such as e.g. glasses that open only for Left images for both eyes, and view two would have occlusion devices such as e.g. glasses that open only for Right images. In this way the viewers could interact with unique images on the same screen. For example, an instructor and student could use this capability to interact with images while providing additional private information to the instructor. Furthermore, all examples given comprise a set-up with three projecting devices. However, the principles of the present invention can equally well be applied on one single projecting device, as well as on a combination of any number of projecting devices. Also, the plurality of projection devices may be arranged to display multiple independent or any combination of independent and tiled images. Such a configuration is useful where a single area or room has multiple stereo displays where it is desirable to have all stereo glasses operating in synchronism thereby avoiding problems with multiple conflicting stereo emitter signals. Although this description discusses projection devices, the principles of this invention can equally well be applied to any video processing device, or to a display device such as a direct view monitor.

The output signals from the video processor may take any suitable form, e.g. a single video output signal with video frames containing multiple fields a single video output signal with video frames using even field/odd field, a single video output signal wherein field imagery is spatially separated in single or multiple video streams, a multiple video output signal comprising, at least, a first single video output signal and a second single video output signal. The output signals may be analog or digital and may be transmitted by any suiatbel channel, e.g. cable, optical fiber, wireless connections as is known to the skilled person.

Similarly, the input signals may take corresponding forms and be input from similar channels.

The invention claimed is:

1. An imaging system for multiple view imaging comprising at least a first and second video processing device, each of the at least first and second video processing devices being for displaying a video image on one or more display devices, each video processing device receiving at least a first sequence of image frames comprising at least a second sequence of image frames and a third sequence of image frames, the at least second and third sequences of image frames being for generating at least first and second video streams, respectively, wherein the individual image frames of the second sequence are multiplexed with the individual image frames of the third sequence so as to form frame pairs, each frame pair containing an image frame from the at least second sequence of image frames and from the third sequences of image frames and each video processing device outputting a fourth sequence of image frames, the fourth sequences of image frames being for generating at least one of the at least first or second video streams, the fourth sequence of image frames from the at least first and second video processing devices being derived from the first sequence by repeating at least one of the frame pairs or by eliminating at least one of the frame pairs and wherein the imaging system is adapted to utilize a linking signal for synchronizing images displayed by at least one of the at least the first and second video processing devices on the display device.

2. An imaging system according to claim 1 wherein the fourth sequence comprises at least a fifth sequence of multiple view display image frames and a sixth sequence of multiple view display image frames, the at least fifth and sixth sequences of image frames being for generating the at least first and second video streams, respectively.

3. An imaging system according to claim 1, wherein the at least first and second video images are sequenced framewise when displayed to form a multiple view image.

4. An imaging system according to claim 1, wherein the fourth sequence comprising, at least, the fifth and sixth sequences is any of:
a single video output signal with video frames containing multiple fields,
a single video output signal with video frames using even field/odd field,
a single video output signal wherein field imagery is spatially separated in single or multiple video streams,
a multiple video output signal comprising, at least, a first single video output signal and a second single video output signal, where the video output signals are interpreted according to any of the above methods.

5. An imaging system according to claim 1, wherein the linking signal is an additional signal to those signals required to display the, at least, first or second video images per se.

6. An imaging system according to claim 1, wherein each video processing device receives furthermore an input control signal corresponding to an input rate and phase of the, at least, second and third sequences of image frames.

7. An imaging system according to claim 1, wherein the linking signal is a signal which is generated externally to the video processing devices.

8. An imaging system according to claim 1, wherein the linking signal is a signal which is generated internally in one of the video processing devices.

9. An imaging system according to claim 1, furthermore comprising at least one image source.

10. An imaging system according to claim 9, there being at least two image sources of different types or operating at differing rates or phases, i.e. asynchronously, or both.

11. An imaging system according to claim 1, adapted to process the first sequence of input image frames and having means for field rate converting the first sequence.

12. An imaging system according to claim 1, wherein the, at least, second or third sequence is processed in frame sets.

13. An imaging system according to claim 2, wherein the imaging system is adapted to generate an output control signal for an image modulation device allowing the image modulation device to properly synchronize with the output rate and phase of the, at least, fifth and sixth sequences.

14. An imaging system according to claim 13, wherein the image modulation device is any of active glasses with a synchronization system, passive glasses with active polarization device, or another actively controlled obscuration device.

15. An imaging system according to claim 13, wherein the output control signal is functionally compatible with the linking signal.

16. An imaging system according to claim 6, wherein the input control signal is provided by means of a separate signal, a signal encoded on a vertical synchronization signal, a signal encoded as an even/odd field, a signal encoded in a video signal, or any other means to convey intent.

17. An imaging system according to claim 1, wherein the first sequence comprising, at least, second and third sequences is any of:
a single video input signal with video frames containing multiple fields,
a single video input signal with video frames using even field/odd field,
a single video input signal where field imagery is spatially separated in single or multiple video streams,
a multiple video input signal comprising, at least, a first single video input signal and a second single video input signal, wherein the video input signals are interpreted according to any of the above methods.

18. An imaging system according to claim 11, adapted to reduce latency between a pair of image frames of the first sequence of image frames and a subsequent output of a corresponding pair of image frames of the fourth sequence by starting the output of a first multiple view display image frame of the pair of display image frames of the fourth sequence before arrival of the complete pair of image frames of the first sequence of image frames when it is known that the completion of the arrival will occur before the expected completion of the output of the first multiple view display image frame of the fourth sequence.

19. An imaging system according to claim 1, comprising splitting means for splitting the first sequence of image frames into the second sequence and the third sequence.

20. An imaging system according to claim 19, furthermore comprising processing means for processing any of the second sequence or third sequence.

21. An imaging system according to claim 19, furthermore comprising a combining means for combining the second sequence and the third sequence into one combined stream of image frames.

22. An imaging system according to claims 1, wherein the at least two video processing devices are any of or a combination of, front projectors, rear projectors, direct view displays, or control devices with outputs to drive video devices.

23. Use of an imaging system according to claim 1, wherein the video processing devices create any of, or a combination of one or more of:
a single large image by tiling the at least two video processing devices,
multiple separate independent tiled images by using multiple sub-sets of the video processing devices, or
single projected images using a single video processing device.

24. A method for performing multiple view imaging by means of at least a first and a second video processing devices, each of the at least first and second video processing devices being for displaying a video image on one or more display devices, the method comprising:
receiving at least a first sequence of image frames comprising at least a second sequence of image frames and a third sequence of image frames, the at least second and third sequences of images frames being for generating at least first and second video images, respectively,
whereby the individual image frames of the second sequence are multiplexed with the individual image frames of the third sequence so as to form frame pairs, each frame pair containing an image frame from the at least second sequence of image frames and from the third sequences of ma e frames and
deriving at least a fourth sequence of image frames, the at least fourth sequences of image frames being for generating at least one of the first and second video images, the fourth sequence being derived from the first sequence by repeating at least one of the frame pairs or by eliminating at least one of the frame pairs.

the method comprising generating a linking signal for synchronizing images displayed by the at least one of the first and second video processing devices on the display device.

25. A method according to claim 24, wherein generating the linking signal comprises generating the linking signal externally to the video processing devices.

26. A method according to claim 24, wherein generating the linking signal comprises generating the linking signal internally in one of the video processing devices.

27. A method according to claim 24, furthermore comprising providing images from at least one image source.

28. A method according to claim 27, wherein the images are provided from at least two image sources of different type.

29. A method according to claim 24, furthermore comprising generating a control signal for an image modulation device allowing the image modulation device to properly synchronize with an output rate and phase of the fourth sequence of image frames.

30. A method according to claim 24, wherein the processing of image frames of the first sequence is optimized to reduce latency between a pair of image frames of the first sequence and a subsequent output of a corresponding pair of image frames of the fourth sequence by starting the output of a first multiple view display image frame of the fourth sequence before arrival of the complete pair of image frames of the first sequence of image frames when it is known that the completion of the arrival will occur before the expected completion of the output of the first multiple view display image frame of the fourth sequence.

31. A method according to claim 24, comprising splitting the first sequence of image frames into the second sequence intended to be viewed by a first eye and the third sequence intended to be viewed by a second eye of a human person.

32. A method according to claim 31, furthermore comprising processing any of the second sequence or third sequence.

33. A method according to claim 31, furthermore comprising combining the second sequence and the third sequence into one combined stream of image frames.

34. A controller for controlling the operation of at least first and second video processing devices in an imaging system for displaying multiple view images, each of the at least first and second video processing devices being for displaying a video image on one or more display devices, each video processing device receiving at least a first sequence of image frames comprising at least a second sequence of image frames and a third sequence of image frames, the at least second and third sequences of image frames being for generating at least first and second video images, respectively, whereby the individual image frames of the second sequence are multiplexed with the individual image frames of the third sequence so as to form frame pairs, each frame pair containing an image frame from the at least second sequence of image frames and from the third sequences of image frames and each video processing device outputting at least a fourth sequence of image frames, the fourth sequences of image frames being for generating at least one of the first or second video images, the fourth sequence of image frames from the at least first and second video processing devices being derived from the first sequence by repeating at least one of the frame pairs or by eliminating at least one of the frame pairs, and wherein the controller is adapted to generate a linking signal for synchronizing images displayed by at least one of the at least first and second video processing devices on the display.

* * * * *